D. T. FISHER.
GATHERING LOCOMOTIVE WITH HAULAGE MECHANISM.
APPLICATION FILED MAR. 17, 1909.
1,123,267.
Patented Jan. 5, 1915.
5 SHEETS—SHEET 2.
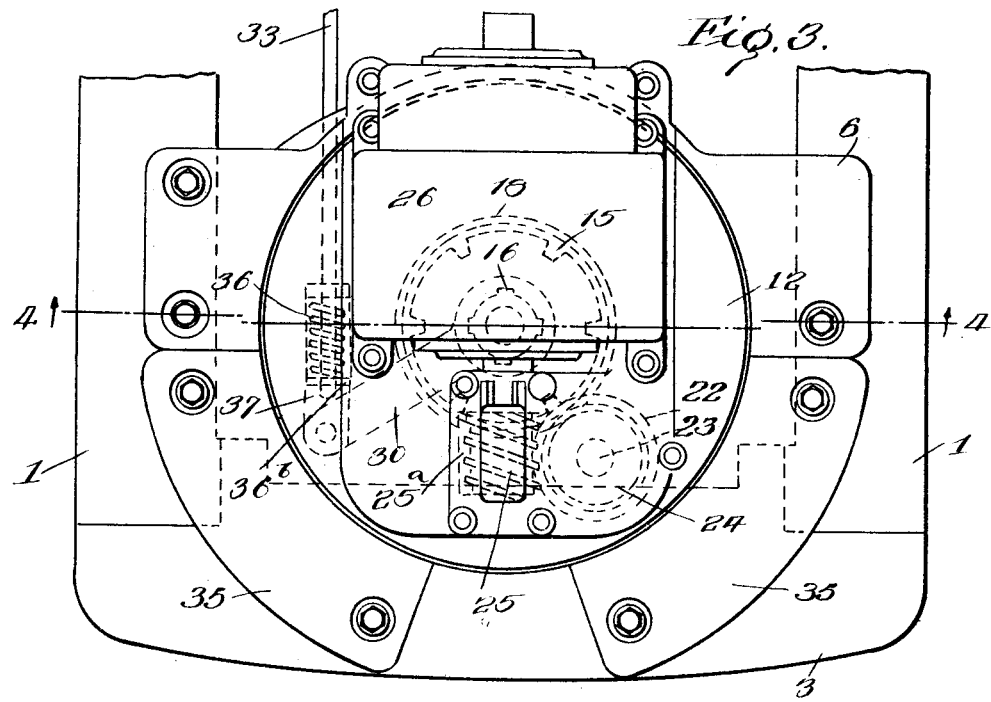
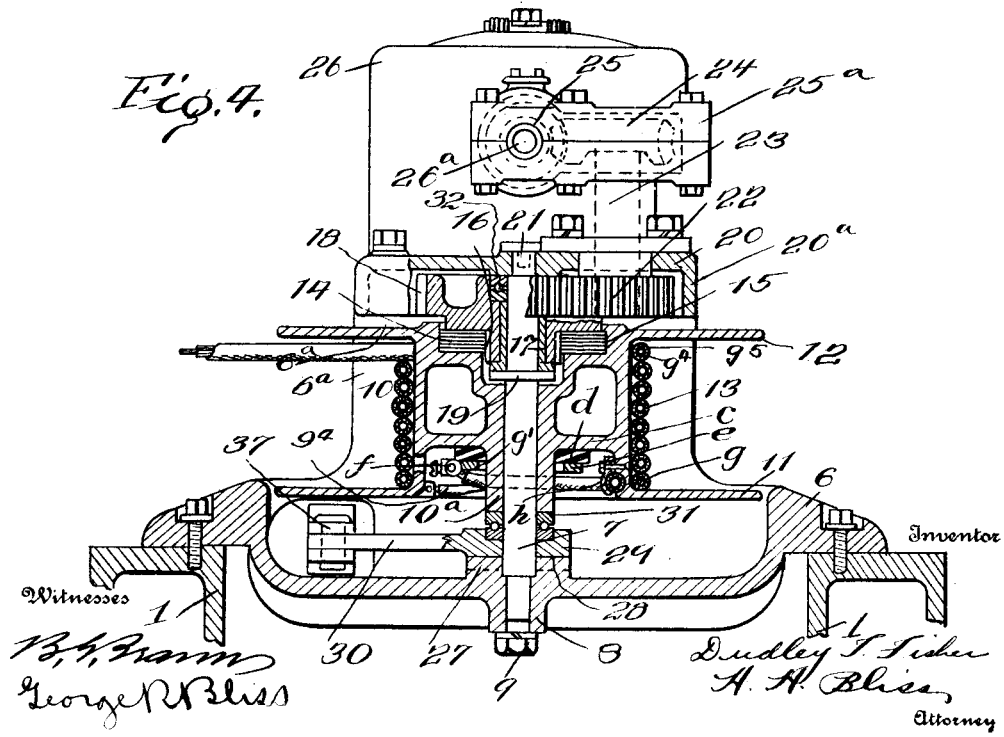

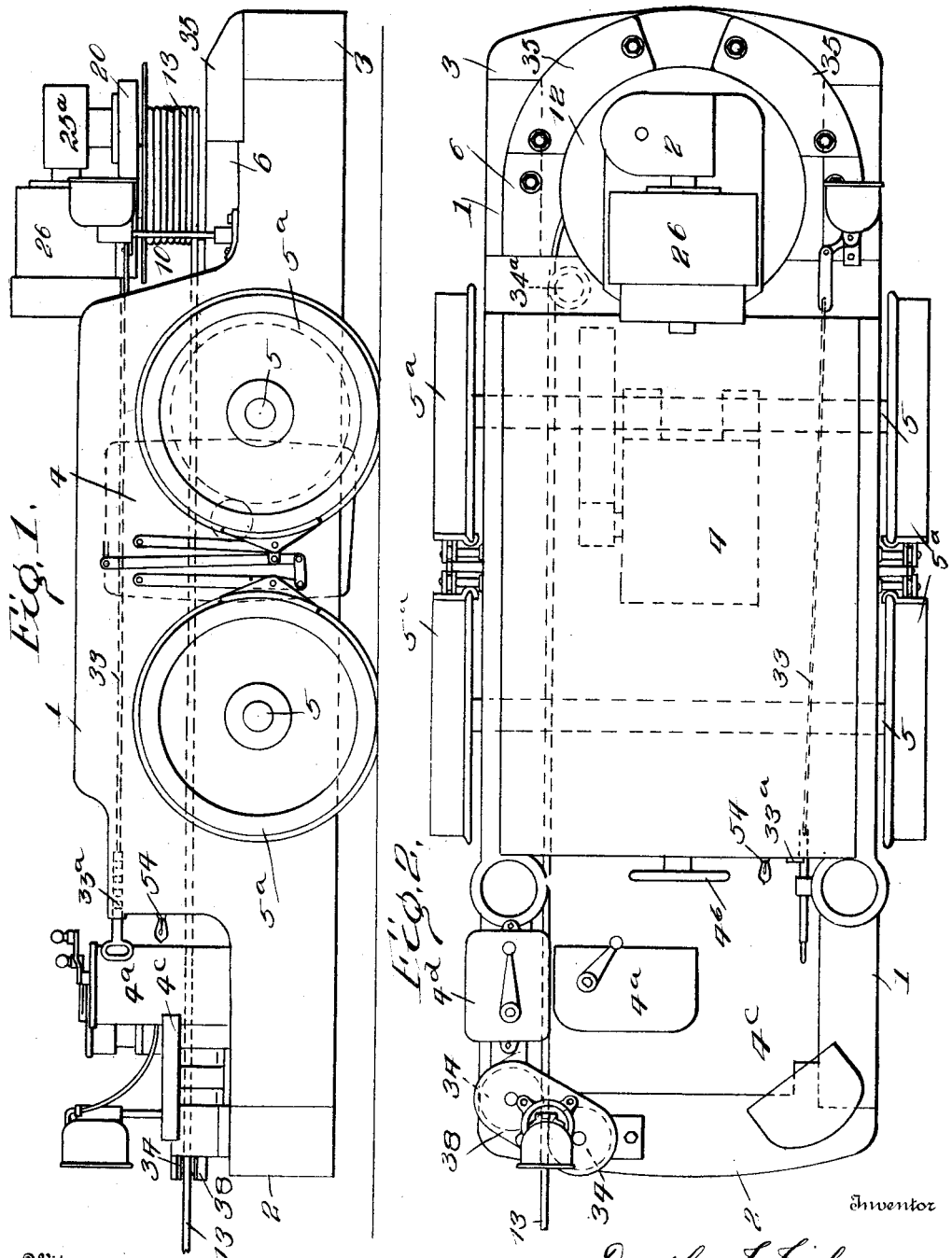

D. T. FISHER.
GATHERING LOCOMOTIVE WITH HAULAGE MECHANISM.
APPLICATION FILED MAR. 17, 1909.
1,123,267.
Patented Jan. 5, 1915.
5 SHEETS—SHEET 3.
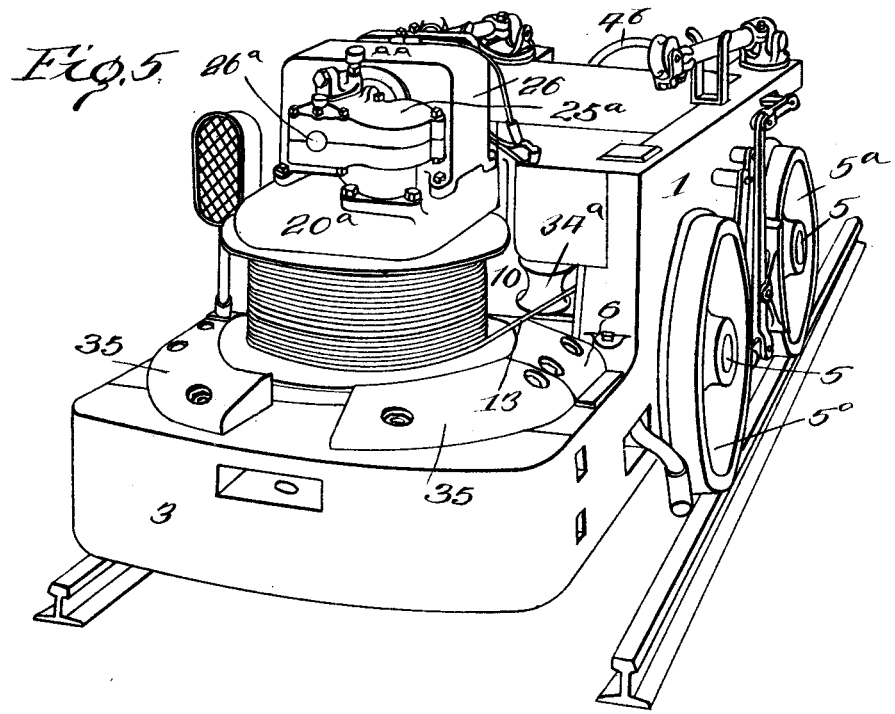
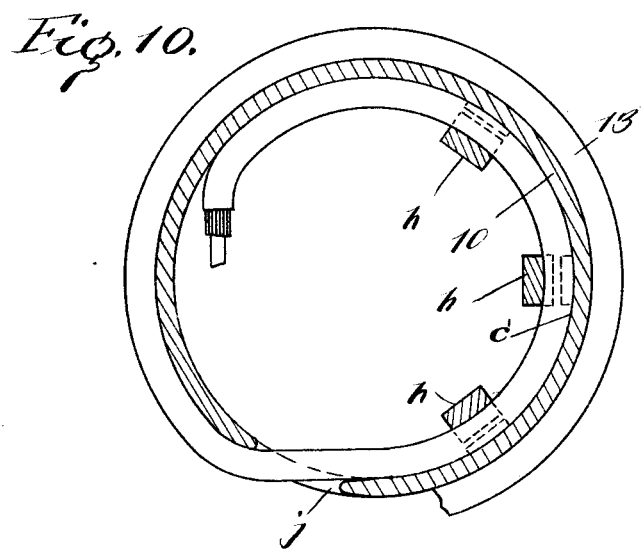

D. T. FISHER.
GATHERING LOCOMOTIVE WITH HAULAGE MECHANISM.
APPLICATION FILED MAR. 17, 1909.

1,123,267.

Patented Jan. 5, 1915.

5 SHEETS—SHEET 4.

Witnesses
B. F. Francis
George R. Bliss

Inventor
Dudley T. Fisher
By H. H. Bliss
Attorney

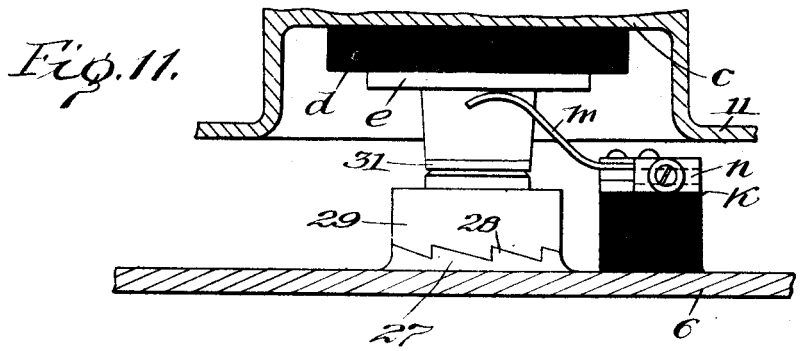
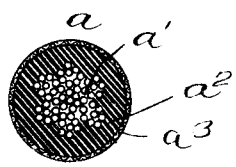
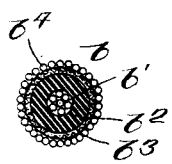
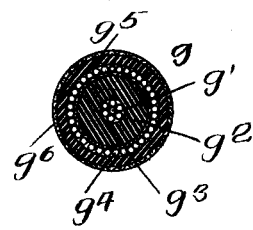
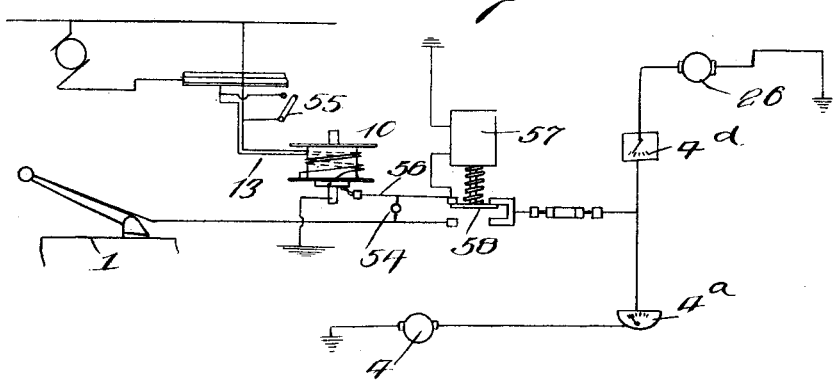

UNITED STATES PATENT OFFICE.

DUDLEY T. FISHER, OF COLUMBUS, OHIO, ASSIGNOR TO THE JEFFREY MANUFACTURING COMPANY, A CORPORATION OF OHIO.

GATHERING-LOCOMOTIVE WITH HAULAGE MECHANISM.

1,123,267.　　　　Specification of Letters Patent.　　Patented Jan. 5, 1915.

Application filed March 17, 1909. Serial No. 483,963.

*To all whom it may concern:*

Be it known that I, DUDLEY T. FISHER, a citizen of the United States, residing at Columbus, in the county of Franklin and State of Ohio, have invented certain new and useful Improvements in Gathering-Locomotives with Haulage Mechanism, of which the following is a specification, reference being had therein to the accompanying drawings.

This invention relates to electric mine locomotives and has as its object to provide such a locomotive equipped with a cable capable of conducting electric current from a fixed conductor to the locomotive when the locomotive is being operated in those parts of the mine which are not provided with a trolley wire, the cable being also adapted to be used as a haulage means for drawing cars toward the locomotive while the latter maintains a stationary position, or to assist the locomotive in drawing itself up excessive grades.

Figure 6:
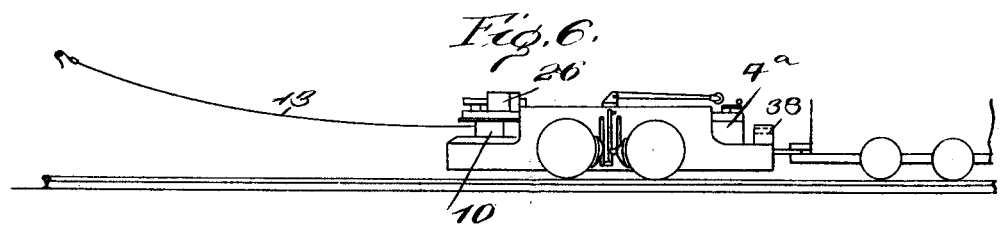
Figure 7:
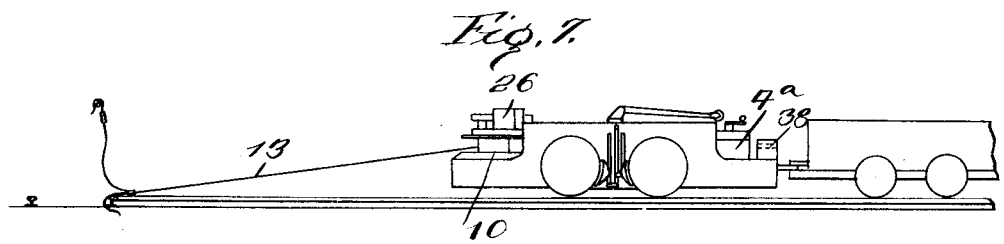
Figure 8:
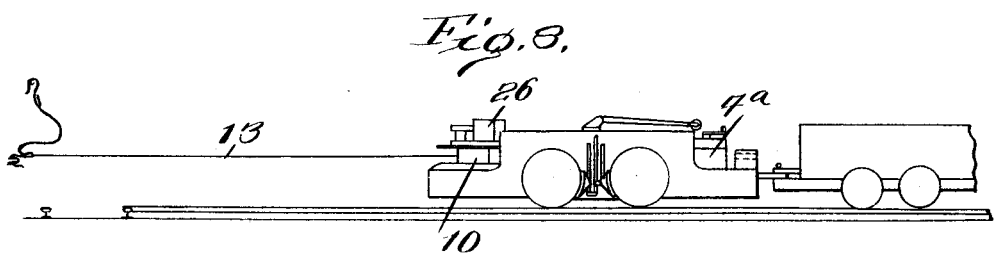
Figure 9:
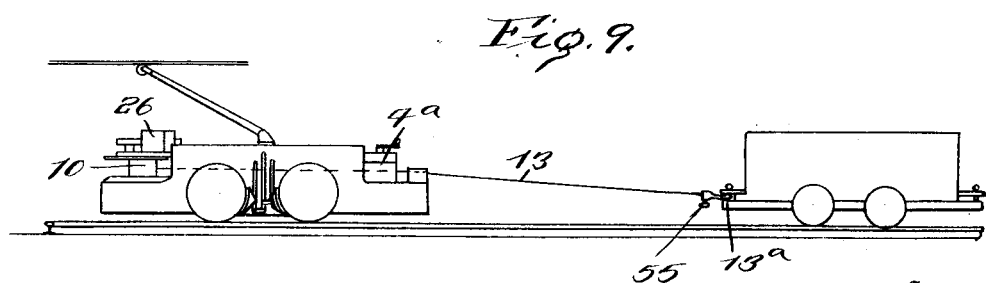

Figure 1 of the drawings is a side view of the locomotive equipped in accordance with my invention. Fig. 2 is a plan view of the same. Fig. 3 is a detail plan view of the reel mechanism. Fig. 4 is a cross sectional elevation of the reel mechanism partly in vertical section along the line 4—4 of Fig. 3. Fig. 5 is a perspective view of the locomotive. Fig. 6 shows a locomotive pulling a car, the locomotive being supplied with current by means of a single conductor cable. Fig. 7 shows a locomotive, the motors of which are supplied with current by means of a double conductor cable. Fig. 8 shows the same locomotive as that shown in Fig. 7, with the cable secured at its free end so that it can be used to assist the locomotive in ascending the grade. Fig. 9 shows the same locomotive with its trolley mechanism in engagement with a trolley wire, its wheels braked and its cable employed to haul toward it a car. Fig. 10 is a fragmentary view of the reel showing the manner in which the cable is secured thereto. Fig. 11 is an elevation of the current collecting mechanism for the reel. Fig. 12 is a cross section of a single conductor haulage cable. Fig. 13 is a cross section of another type of single conductor haulage cable. Fig. 14 is a cross section of a haulage cable by which current can be conducted in both directions simultaneously. Fig. 15 is a diagram of the electrical circuit of the locomotive.

In the drawings 1—1 and 2—3 indicate the side and end pieces of the frame structure of the locomotive. In the side frames 1—1 are mounted the wheel axles 5, upon which are secured the wheels $5^a$ fitted to the track in the usual manner.

4 is the motor geared to the forward axle 5 and adapted to move the locomotive bodily along the track. At the rear end of the locomotive are arranged the controlling devices, such as the electric controller $4^a$, the brake wheel $4^b$, etc., and the seat for the motorman $4^c$.

To the side frames 1—1 near the forward end of the locomotive is secured the transverse base casting 6. A vertical shaft 7 is secured in a central boss or hub 8 of this base casting 6, by means of the nut 9. Journaled upon this shaft is a hub $10^a$ having flanges 11 and 12 forming a winding drum or winch to which is secured and upon which is wound the steel haulage and conductor cable 13.

The upper face of the hub 8 is provided with spiral cam surfaces or teeth 27 which engage similar teeth 28 on the lower side of the hub 29 of the lever 30 which is pivoted to the shaft 7. The upper face of the hub 29 is recessed to receive the thrust collar of the ball bearing 31 on which rests hub $10^a$ of the reel. The arm 30 is moved about its point of pivotal attachment by means of the lever rod 33, which is extended rearward to a point within reach of the operator. A certain degree of flexibility in the lever system allowing the rod 33 to be pulled far enough to be latched at $33^a$, is obtained by means of the clevis 37 pivotally secured to the outer end of the arm 30 and the spring 36 interposed between the nut $36^b$ on the end of the rod and the clevis. This lever when pulled by the motorman operates to raise the reel bodily upon the shaft 7 for a purpose to be presently described.

The upper part of the hub $10^a$ of the reel is recessed to receive a stack of friction disks 14, each alternate disk having notches on its outer edge to engage with a plurality of keys 15 on the reel, the remaining disks having notches in their inner edges to engage the keys 16 on the hub 17 of the gear wheel 18 which is journaled on the shaft 7, above the reel hub and vertically supported by means of the collar 19. The upper end of the shaft 7 is fitted into the reel frame casting 20, which is bolted to the base casting 6. The shaft is secured in position by the screw 21.

The frame casting 20 is provided with a flange $20^a$ extending downwardly about its four sides affording thereby a protection to the gearing by which the reel is operated. This frame casting is supported by means of the rear upstanding wall $6^a$ of the base casting 6 and by the shaft 7. Meshing with the gear 18 is a pinion 22 fixed upon a vertical shaft 23 passing through an opening in the top of the frame casting 20. Upon the upper end of this shaft 23 is secured the worm gear 24 which meshes with the worm 25 fixed to the armature shaft $26^a$ of the motor 26. This motor is supported upon the frame casting 20 and its armature shaft is arranged longitudinally of the locomotive. A suitable gear casing $25^a$ is provided for the worm and worm wheel which also serve to support the shaft 23. The worm gearing 24—25 is self-locking and will remain stationary when acted upon by power transmitted from the reel. A starting box $4^d$ is provided for controlling the motor 26.

When it is desired to wind the cable 13, the motor is started. The arm 30 is rotated by pulling the rod 33 causing the cam surface 28 to climb on the cam surface 27. The hub 29 is thereby lifted together with the ball bearing 31 and the hub $10^a$, the disks 14 being pressed together, operatively and yieldably connecting the reel with the gear wheel 18. Between the gear 18 and the top wall of the frame casting 20 is interposed the ball bearing 32 which prevents the gear wheel from being elevated when the rod 33 is pulled and takes the thrust of the upwardly pressed friction disks. When now it is desired to unwind the cable, the rod 33 is pushed back rotating the lever arm 30 in the reverse direction. The cam faces slip into their former position, allowing the hub $10^a$ to drop away from the disks 14. The pressure in the friction clutch is relieved and the winch is allowed to spin freely under the tension of the cable as it is carried into the rooms by the operator. The gears 18 and 22 are held stationary by means of the worm wheel 24 which has a non-overhauling engagement with the worm 25. If at any time the cable unwinds too rapidly or in a jerky fashion, the rotation of the reel can be steadied by pulling the lever 33 sufficiently to apply the desired brake pressure between the friction disks 14. Suitable cast iron guards 35 are bolted to the end frame 3 to prevent loose coils of the cable from fouling under the flange 11 of the winch.

The cable may be drawn out from the forward end of the locomotive to either side, or it may pass back to the control end of the locomotive guided by the roller $34^a$ and the sheaves 34, which are supported in the bracket 38 secured to the side of the end frame piece 2 opposite the motorman's seat. The line joining the axes of these sheaves is inclined somewhat to the transverse lines of the locomotive. From these sheaves the cable can be carried in any direction over an angle of 180° or greater, as local conditions may dictate.

An axle ring $d$ of insulating material is attached to the lower face of the central web $c$ of the reel. Upon this axle ring is mounted the collector ring $e$ which is provided with the connector $f$ to receive the end of one of the electric conductors $g'$ of the cable 13. The end of the other conductor $g^4$ is electrically connected and mechanically secured to the metal of the reel. Positioned on the inner face of the drum $c'$ of the reel are a plurality of clamps $h$ which grip the cable, holding it securely against those stresses which it is called upon to resist in haulage service. The cable passes from the outside of the drum to the interior through the aperture $j$.

Upon the frame 6 (see Fig. 11) there is mounted a block $k$ of insulating material which supports the contact spring $m$ arranged to have sliding engagement with the collector ring $e$ and provided with the connector $n$ to receive the terminal of the wire leading to the locomotive and reel motors. This contact spring is of sufficient length and flexibility to permit it to accommodate itself to the various positions of the reel 10 incident to the operation of the lever 30 for the manipulation of the friction clutch 14.

The construction of the cable shown in Figs. 4, 7, 8, 9, 10, 11 and 15, is illustrated in Fig. 14. The cable seen in Fig. 6 may have an interior construction, such as shown in Fig. 12 or one such as is shown in Fig. 13.

The cable $a$ shown in Fig. 12 has a central core $a'$ of steel wire, stranded in the manner usually employed in the manufacture of haulage cables, and this steel core is surrounded by an insulating jacket $a^2$, and outside of this insulation by the braided thread armor $a^3$. The central steel strands are sufficiently strong to withstand the tensile stress sustained by the cable when cars are being hauled toward the locomotive or when the locomotive is pulling itself up a grade by means of the cable, the end of the cable being secured to a fixed point. The steel strands also serve to conduct current to the motors upon the locomotive when the locomotive is running toward and from a fixed conductor to which the end of the cable has been secured. It also serves to conduct current to the lamp 54 when the latter is operated in a manner to be presently described. Fig. 13 shows a cable $b$ having a core of stranded copper wires $b'$ surrounded by the insulation $b^2$ and the braided thread $b^3$, around all of which is the armor of steel strands $b^4$. This cable is thus provided with a copper conductor and also possesses the required tensile strength for haulage work, because of the use of the steel wire $b^4$.

The two cables shown in Figs. 12 and 13 are each provided with a single insulated conductor. Fig. 14 shows a cable $g$ having two insulated conductors. It is formed similarly to the cable $b$ of Fig. 13 having the stranded copper core $g'$, the surrounding insulation $g^2$, the braided thread $g^3$ and the steel strand $g^4$, with the addition of the second insulating jacket $g^5$ and the braided thread $g^6$.

In Fig. 15 there appears a diagram of connections for a cable having two conductors. At the free end of the cable one of the conductors is connected to a trolley wire and the other to the rails of a track. The cable is wound upon the reel 10 as shown, one of the conductors being grounded through the metallic parts of the reel and locomotive, and the other being connected through the collector ring and the contact with the conductor 56. 57 is a solenoid connected between the conductor 56 and the ground. Whenever the conductor 56 is energized, the solenoid 57 acts to throw the switch 58 to make contact between the conductor 56 and the controllers 4ª and 4ᵈ each connected respectively with the motors 4 and 26. Whenever the solenoid 57 is not energized, the switch 58 is thrown by the spring to connect the trolley mechanism with the controllers. The following are some of the conditions under which the locomotive equipped with the reel carrying such a combined haulage and conductor cable can be advantageously employed. If it is desired to withdraw loaded cars from the rooms in which the coal is being cut, to the entries where they are made up into trains, or to distribute the empty cars of a train and place them in the rooms, a locomotive equipped in accordance with this invention can be operated as follows: The free end of the cable is first secured to the trolley wire, if it is a single conductor cable, or to both the trolley wire and the track rail, if it is a double conductor cable. The locomotive is switched into the room or branch entry unequipped with trolley wire. The locomotive motor is started by means of the controller 4ª, propelling the locomotive along the tracks, and by means of the rod 33 the retarding effect of the friction clutch is adjusted to cause the reel to unwind the cable uniformly as it is pulled from the locomotive by the movement of the latter. When the locomotive is moving toward the fixed conductor both the locomotive motor and the reel motor are started by means of their respective controllers, and the cable is picked up. Under ordinary circumstances the cable is not used as a haulage cable when the locomotive is thus moving into and out of the rooms gathering and placing the cars. But if the grade to be ascended in returning toward the trolley wire is excessive, by increasing the grip between the disks of the friction clutch the reel is caused to apply to the locomotive a propelling force which materially assists it in ascending the grade. When thus used the free end of the cable must be so secured mechanically, in addition to its electrical connection, that it will not be pulled from its fastening. A double conductor cable thus used is shown in Fig. 8. The cable can be used to assist the locomotive in ascending high grade sections of track whether the current be collected by means of the cable or by means of the trolley pole mechanism. In the latter case the cable is carried ahead of the locomotive and secured at a point at the top of the grade; both the reel and wheel driving motors are set in operation or, if so desired, the reel motor only; and the locomotive, together with the cars which it may be hauling, are moved along the track by means either wholly or in part of the winding torque applied to the reel. A locomotive equipped in the same manner can be used to gather cars from the rooms by stationing the locomotive in the entry with its brakes set and its trolley wheel in contact with the entry trolley wire, by drawing cable off from the reel sufficiently to permit the coupler 13ª at its free end to be attached to a car and then starting the reel motor to wind up the cable and draw the car toward the locomotive which is held against bodily movement by means of its brakes. This use of the cable and reeling mechanism is of particular advantage when the cars are to be hauled up excessive grades. When thus used it becomes desirable for the man who carries the free end of the cable to signal the motorman that he has coupled the cable to a car so that the motorman may know when to start the reel motor 26. For this purpose a lamp is provided upon the locomotive within sight of the motorman, which can be thrown into and out of circuit at will by means of the switch 55 at the free end of the cable. The electric circuit will be from the trolley mechanism directly to the lamp 54, from the lamp through one of the conductors of the cable to the switch 55, and from the switch 55 back through the other conductor of the cable to the ground. By means of the switch 55 the lamp can be flashed and the motorman signaled to start the reel motor.

What I claim is:

1. In a locomotive of the class described, the combination with the main frame, the track wheels and the electric motor for driving the track wheels, of a rotatable reel carried by the frame, a cable connected to the reel to be wound thereon, the said cable having a tensile strength sufficient for the haulage of cars or for the movement of the locomotive itself and being provided with an inner metallic element electrically insulated from the exterior surface, insulated means at the reel end of the cable for electrically connecting the said inner metallic element of the cable to the aforesaid motor for driving the locomotive wheels, means for securing the otherwise free end of the cable to a car or to a fixed anchor or to an electric supply conductor whereby the cable can be used for exerting tension or for transmitting current through the said inner metallic element to the motor, and a manually controllable means operable independently of the locomotive track wheels for rotating the reel, the said means having sufficient power to haul a car or move the locomotive by means of the said cable.

2. In a locomotive of the class described, the combination with the main frame, the track wheels and the electric motor for driving the track wheels, of a rotatable reel carried by the frame, a cable connected to the reel to be wound thereon, the said cable having a tensile strength sufficient for the haulage of cars or for the movement of the locomotive itself and being provided with an inner metallic element electrically insulated from the exterior surface, means for securing the otherwise free end of the cable to a car or to a fixed anchor or to an electric supply conductor whereby the cable can be used for exerting tension or for transmitting current through the said inner metallic element, a manually controllable electric motor supplemental to the aforesaid motor and operable independently of the locomotive track wheels for rotating the reel, the said motor having sufficient power to haul a car or move the locomotive by means of the said cable, and insulated means at the reel end of the cable for electrically connecting the said inner metallic element of the cable to the said motor for driving the locomotive wheels and to the said motor for driving the reel.

3. The combination of an electric locomotive, an electric motor for controlling the locomotive, a rotatable reel, a cable comprising two conductors insulated from each other, the cable having a tensile strength sufficient for the haulage of a car, means for securing one end of the cable to the reel for winding thereon, means for securing the other end of the cable to a car, means for rotating the reel, an electrically operated signaling device on the locomotive electrically connected to the conductors of the cable, and means at the outer end of the cable for closing an electric circuit through the said signaling device.

4. The combination of an electric locomotive, an electric motor for controlling the locomotive, a rotatable reel, a cable comprising two conductors insulated from each other, the cable having a tensile strength sufficient for the haulage of a car, means for securing one end of the cable to the reel for winding thereon, means for securing the other end of the cable to a car, means for rotating the reel, a trolley mechanism on the locomotive, an electrically operated signaling device interposed between the trolley mechanism and one of the conductors of the cable, a connection between the ground and the other conductor of the cable at the reel end thereof, and a device at the outer end of the cable for closing the electric circuit through the signaling device.

5. The combination of an electric locomotive, a motor for propelling the same, a reel mounted on the locomotive in a manner adapted to resist haulage strains, a cable wound upon the reel and adapted to haul vehicles and to conduct electric current from a fixed conductor to the locomotive, the inner end of the cable, passing through the cable supporting web of the reel, means for securing the said inner end to the inner face of the reel, means for collecting current from the said inner end of the cable to be conducted to the locomotive motor, and means for rotating the reel.

In testimony whereof I affix my signature, in presence of two witnesses.

DUDLEY T. FISHER.

Witnesses:
E. L. HOPKINS,
J. G. CHANDLER.